(12) United States Patent
Gansen et al.

(10) Patent No.: US 8,892,041 B2
(45) Date of Patent: Nov. 18, 2014

(54) SWITCHING DEVICE FOR CAR-TO-X COMMUNICATION AND COMMUNICATION DEVICE

(75) Inventors: Tobias Gansen, Ingolstadt (DE); Nils Oppermann, Ingolstadt (DE)

(73) Assignee: Audi AG, Ingolstadt (DE)

( * ) Notice: Subject to any disclaimer, the term of this patent is extended or adjusted under 35 U.S.C. 154(b) by 201 days.

(21) Appl. No.: 13/614,821

(22) Filed: Sep. 13, 2012

(65) Prior Publication Data

US 2013/0065530 A1 Mar. 14, 2013

(30) Foreign Application Priority Data

Sep. 14, 2011 (DE) .......................... 10 2011 113 300

(51) Int. Cl.
*H04B 7/00* (2006.01)
*H04L 12/66* (2006.01)

(52) U.S. Cl.
CPC ...................................... *H04L 12/66* (2013.01)
USPC ......................................... 455/41.2; 340/901

(58) Field of Classification Search
USPC ................ 455/41.2, 422.1, 39, 441; 340/933; 701/36, 39, 119, 1, 70
See application file for complete search history.

(56) References Cited

U.S. PATENT DOCUMENTS

| | | | |
|---|---|---|---|
| 7,596,438 B2 | 9/2009 | Chen et al. | |
| 8,451,812 B2 * | 5/2013 | Stahlin et al. | 370/338 |
| 8,457,123 B2 * | 6/2013 | Grotendorst et al. | 370/389 |
| 8,593,271 B2 * | 11/2013 | Amann | 340/435 |
| 8,688,376 B2 * | 4/2014 | Stahlin et al. | 701/517 |
| 2004/0254690 A1 | 12/2004 | Hasegawa et al. | |
| 2007/0150169 A1 | 6/2007 | Tomita et al. | |
| 2009/0185489 A1 * | 7/2009 | Ruffini et al. | 370/237 |
| 2010/0255866 A1 * | 10/2010 | Radtchenko | 455/500 |
| 2013/0179001 A1 * | 7/2013 | Nordbruch | 701/1 |
| 2014/0104077 A1 * | 4/2014 | Engel et al. | 340/901 |
| 2014/0118169 A1 * | 5/2014 | Hamberger et al. | 340/936 |

FOREIGN PATENT DOCUMENTS

| | | |
|---|---|---|
| CN | 101064901 | 10/2007 |
| DE | 10 2008 060 231 | 6/2009 |

OTHER PUBLICATIONS

Chinese Office Action for related Chinese Patent Application No. 201210338971.8, issued Dec. 27, 2013, 15 pages.

* cited by examiner

*Primary Examiner* — Sonny Trinh

(74) *Attorney, Agent, or Firm* — Staas & Halsey LLP

(57) ABSTRACT

A switching device for connection to an antenna unit and a computing unit to form a communication device for car-to-X communication, in particular a DSRC communication device. The switching device has at least one interface for communication with a mobile terminal device, in particular a mobile telephone. The switching device includes a computing unit and a control device to forward at least a part of received messages to the mobile terminal device and/or to transmit messages on the basis of a control command from the mobile terminal device.

22 Claims, 1 Drawing Sheet

SWITCHING DEVICE FOR CAR-TO-X COMMUNICATION AND COMMUNICATION DEVICE

CROSS REFERENCE TO RELATED APPLICATIONS

This application is based on and hereby claims priority to German Application No. 10 2011 113 300.7 filed on Sep. 14, 2011, the contents of which are hereby incorporated by reference.

BACKGROUND

The invention relates to a switching device for connection to an antenna unit. The invention also relates to a communication device with a switching device of this type.

For gathering information, for exchanging information and for increasing safety in road traffic, communication systems in which as many road users as possible are involved are subject to development. While communication between motor vehicles, referred to as car-to-car (C2C) communication, is intended to enable communication between motor vehicles via corresponding communication devices, concepts for car-to-X or car-to-environment (car-to-X, C2X) communication are also already known. In particular in this respect, it has been proposed to enable a communication with fixed infrastructure units, for example to enable a communication with traffic lights or the like via a car-to-infrastructure communication.

Communication systems of this type are intended to support wireless ad hoc communication, so that road users can exchange standardized messages via fixed radio frequencies. Particularly the Dedicated Short-Range Communication (DSRC), which provides communication channels and corresponding protocols and standards, is known here. A further approach is the IEEE 802.11p standard, which relates to wireless LAN (WLAN). The use of Bluetooth in local area communication has also already been discussed.

Local area communication between road users offers a multiplicity of functions of reciprocal information provision and warning, for example emergency warning systems for motor vehicles, cooperative ACC, collision avoidance measures and the like, but also simplified infrastructure systems such as electronic parking billing and toll checks.

For communication in a car-to-X communication system, the communication users require a communication device which should comprise an antenna and a facility for data processing to produce the required functions. In DE 10 2010 002 092 A1, it is suggested to use a data preprocessing unit which, for example, does not forward unsuitable data to a safety system or mobility system of a user. DE 10 201 0 029 482 A1 discloses a switching device in the form of an interface device, to which an antenna unit can be connected and which furthermore has an interface to a motor vehicle communication system, for example a CAN bus.

The incorporation of further communication users along with fixed infrastructure units, for example traffic lights and motor vehicles, reveals itself to be problematic. In order, for example, to equip pedestrians or cyclists also with communication devices for car-to-X communication, mobile communication devices would be needed which require in particular a compact structure, but also an adequate power supply. Whereas the antennas used for car-to-X communication are usually quite large, a large amount of power, which requires a corresponding outlay in terms of design and construction, is required to transmit messages and process and evaluate the messages arriving in large numbers.

US 2004/0254690 A1 relates to a modular navigation system module, which is intended for use in various motor vehicles. It is therefore proposed that the module itself recognizes the vehicle type of the vehicle and adapts its information output accordingly. A Bluetooth module, an IEEE 802.11x module and a DSRS module can be present in the same network, a "media oriented system transport" (MOST) network. The Bluetooth module can allow the information exchange of the system with PDAs, mobile telephones and the like.

U.S. Pat. No. 7,596,438 B2 discloses a beacon-based control system in a motor vehicle, which can receive wireless signals from beacons at geographical locations in order to use their information in particular for control in the motor vehicle. An input device to configure the system may comprise a wireless transceiver, for example a mobile telephone, a PDA or a pager. Thus, the motor vehicle can acquire a multiplicity of addable services from a remote control centre through wireless transmission.

The use of the WLAN standard for a C2C communication through the addition of new packet types is described by DE 10 2008 060 231 A1. It is proposed therein to extend the MAC layer of the 802.11 WLAN standard with a data packet type which is ignored by existing WLAN implementations, but can be used by modified implementations to set up an effective C2X communication, after the device to which the respective data frame is transmitted can be selected.

US 2007/0150169 A1 relates to navigation systems, methods and programs dealing with the determination of congestion information of a road connection. Here, a speed sensor can be connected to the navigation control unit.

SUMMARY

One possible object is therefore to indicate a possibility for equipping further road users, in particular pedestrians and/or cyclists, for communication in a car-to-X communication system, which is, in particular, optimized in terms of power consumption, flexibly usable and easily retrofittable.

The inventors propose a switching device of the aforementioned type, which has at least one interface for communication with a mobile terminal device comprising the computing unit, in particular a mobile telephone, and a control device for forwarding at least a part of received messages to the mobile terminal device and/or to transmit messages on the basis of a control command from the mobile terminal device, wherein the control device has a filter configurable on the basis of received control commands of the mobile terminal device to filter received messages which are not to be forwarded.

A switching device of this type, which is normally referred to as a "gateway", therefore has interfaces to an antenna unit, which may however also be integrated into the switching device, and to a mobile terminal device. It is therefore proposed to use computing power of a mobile terminal device to operate the entire communication device. In this way, power is saved not only in the switching device or antenna unit, in that a part of the computing power is transferred to the mobile terminal device, in particular a mobile telephone, but an easily retrofittable package is also employed which makes use of an already available resource, i.e. the mobile terminal device with its already provided power storage system, to form a communication device. After the interface has been clearly defined in terms of both the protocol and the data to be transmitted, the switching device can be used for a wide variety of mobile terminal devices, wherein the only prerequisite is that the corresponding communication protocol is supported and a software and/or hardware is provided which can interpret the messages received via the interface on the terminal device side and/or further information.

Here, it is preferred if, in the forwarding of messages, the fundamental format of the received messages is not changed, since an extremely efficient coding is normally already provided in the local area communication domain by the protocols and standards, which, for example, software on the terminal device side can then interpret and at least partially evaluate. However, it is of course essentially also possible to carry out a preprocessing of the messages, for example in the sense of a partial evaluation or the like, and to forward the results of the evaluation in a specific format.

On the whole, the inventors propose a modular approach geared towards mobile terminal devices, which allows a simple retrofitting of a communication device and furthermore enables the power-optimized design of the communication device and the switching device, which may comprise a minimum functional logic. In this way, road users without a power supply, in particular pedestrians and/or cyclists can be supplied, while it is also essentially conceivable to enable an retrofitting, for example, for drivers of motor vehicles or the like. A low-cost retrofit solution for motor vehicles is therefore also provided, since drivers already have and/or carry with them a mobile terminal device. However, above all due to the equipment of, in particular, pedestrians or cyclists with a communication device, a multiplicity of new functions can be implemented, which can also actively and/or passively increase safety in respect of these road users, thereby also improving the usability of car-to-X communication.

The gateway described, and therefore the switching device described, can be designed to forward at least a part of received messages to the mobile terminal device. This means that messages from other road users are received by the switching device and it can be provided, for example, that relevant messages or message parts are forwarded to a processing logic which can be provided at least partially in the mobile terminal device. Furthermore, the switching device can also be designed to transmit messages on the basis of a control command from the mobile terminal device. This enables, in particular, in the transmission of messages to other road users or other users of the communication system, the implementation of a transmission only if required, i.e. on demand; this means that the entire communication device can be designed in a power-saving manner for silent reception.

With the inventors' proposal, it is provided that the control device has a filter configurable in particular on the basis of received control commands of the mobile terminal device for filtering received messages which are not to be forwarded. This means that the messages can be filtered in order to thus reduce the data quantity for the final evaluation. The filtering can be carried out here, for example, according to source type, source quantity, source distance and other parameters. It is provided that the filter is configurable on the basis of received control commands of the mobile terminal device, which means that it is possible to define the messages which are actually to be forwarded, wherein it can also be provided that a plurality of sets of filter parameters for selection on the basis of a control command and/or a plurality of filters for selection on the basis of a control command are stored in the switching device. In this way, a filter can be designed as totally configurable by the mobile terminal device, so that, in particular, the switching device is also designed and is therefore usable in terms of a larger number of ultimately required functions or function scopes.

Furthermore, it can be appropriately provided that the control device is designed for at least partial evaluation of received messages. This means that the evaluation of the received messages can already be implemented at least partially by the control device on the switching device side, so that the computing unit of the mobile terminal device then has to evaluate, for example, complex special cases only, or in an extreme case, the computing unit is designed only for essential configuration of the switching device through corresponding control commands.

In a further design, it can be provided that the control device is designed to transmit a message via the antenna unit depending on the evaluation result on the basis of at least one rule. The control device of the switching device can therefore itself decide whether the current situation in fact requires a message to be transmitted, so that it is possible, in particular with regard to power consumption, to restrict the transmission of messages to cases where this is actually required. For example, it may be expedient under specific, defined conditions to transmit a current position of the pedestrian or a warning to a motor vehicle. However, it is also possible for the control unit to be designed to transmit to the mobile terminal device information relating to an output depending on the evaluation result on the basis of at least one rule. This means that, for example, if the output of a warning is established as the evaluation result, corresponding information can be transmitted to the mobile terminal device, which then outputs a corresponding warning, in particular visually and/or audibly, as a visual and/or audible output.

However, information and the like to be presented on the mobile terminal device can also be transmitted via the interface and correspondingly output on the mobile terminal device. It is therefore not necessary to incorporate functions of this type in the switching device also, and the mobile terminal device, in particular a mobile telephone, can be used here.

In this connection, a set of rules comprising the at least one rule can be definable and/or selectable on the basis of a control command of the mobile terminal device. This means that the mobile terminal device can also be used advantageously by the control device in respect of the at least partial evaluation of received messages to configure the switching device. It can be provided here, for example, that at least two sets of rules are permanently implemented in the switching device, in particular as hardware and/or software, between which a selection is made on the basis of the control command. It is also conceivable here that no set of rules is active. As already mentioned, a selection facility or configurability of this type can also be provided for the filter rules of a filter. In this connection, it should also be noted that it is totally conceivable, for the implementation in particular of simple evaluation functions and/or simple filters, to implement this entirely via hardware, i.e. corresponding electronic components, so that designs of the switching devices are also conceivable in which no chip or the like is required there despite further functionalities.

In a further development, it can be provided that the control device is designed to take account of additional information transmitted by the mobile terminal device, in particular position information, and/or a receive signal strength in the evaluation of received messages. If further parameters, for example the position of the communication device formed by the switching device in comparison with the position of a transmitting communication user and the like, are relevant to the evaluation of received messages, information of this type can be determined in the switching device itself or can be made available by the mobile terminal device as additional information. A receive signal strength, for example, which can be regarded as a measure of the distance of a communication user, can be determined by the switching device itself, while it is also essentially conceivable to provide a position sensor in the switching device. However, it is preferred here since many mobile terminal devices already been provided with facilities for position determination, in particular position sensors and/or algorithms to determine a position on the basis of the communication in a communication network, to use these already available resources in the switching device also in that the corresponding additional information is transmitted from the mobile terminal device to the switching device, where it can be processed.

For example, it can be provided that the mobile terminal device cyclically transmits a current position information to the switching device.

As already mentioned, it can be provided that the antenna unit is already integrated into the switching device. However, it is also possible for the antenna unit to represent a further module, which offers further advantageous facilities, in particular in terms of the equipment of specific road users. Thus, for example, it can be provided that the antenna unit can be integrated into a school bag or a bicycle frame. The antenna can therefore be specifically designed for the relevant application and the expected usage environment on the basis of the modular basic structure of the communication device, wherein an incorporation into the school bag or incorporation into the bicycle frame are only advantageous examples for accommodating antennas of the antenna unit which normally require a larger construction space for car-to-X communication.

In order to implement the interface to the mobile terminal device, it can be appropriately provided that a wireless interface, in particular for setting up a Bluetooth connection, and/or a wired interface, in particular for setting up a USB connection, are provided. Bluetooth and USB are communication technologies with which most mobile terminal devices are already equipped, so that the switching device can be used with the known mobile terminal devices, in particular mobile telephones. In particular, a plurality of interfaces, in particular a wireless interface and a wired interface, can be provided, in order to offer as many connection facilities as possible between the switching device and the mobile terminal device.

In an advantageous further development, it can furthermore be provided that, in the case of a wired interface, the switching device is designed to receive operating power from the mobile terminal device. As is generally known, electric power can also be transmitted, for example, via a USB connection, which can be used here, for example, to operate the switching device, which then, in particular, itself requires no power storage system or power source whatsoever.

However, it can of course also, in particular additionally, be provided that the switching device itself comprises a power storage system, in particular a rechargeable battery, with which the switching device and, if necessary, the antenna unit are operated.

In a particularly advantageous design, it can be provided that the control device is designed to operate the switching device only in the presence of a signal indicating a movement of the switching device. In this case, the operation of the communication device is performed in the sense of intelligent power management only if a detected movement also occurs, which means that the carrier of the communication device is actively participating in the traffic event. In this way, power can be saved whenever the communication device is present but no road usage occurs, in that neither an evaluation of received messages nor a transmission of messages takes place, which means that the switching device is in this case in a type of "standby mode". Here, it is particularly advantageous and expedient if the control device is designed to interpret a movement signal as indicating a movement also in a predefined time period following the measurement of the last movement. In this way, temporary movement interruptions, for example if a person carrying the communication device stops briefly on a road or the like, can also be covered, as they may also still be totally relevant to the traffic event. For example, it can be provided that the switching device continues to be operated by the control device for a further predefined time period of 1-3 minutes, in particular 2 minutes, after the last actually occurring movement has been measured.

In order to determine the movement signal, it can be provided that the switching device has at least one movement sensor to determine the movement signal, for example an acceleration sensor. In this case, a movement sensor is therefore incorporated into the switching device itself, so that the movement of the switching device can be tracked directly. Alternatively or additionally, however, it can also be provided that the switching device is designed to receive the movement signal from the mobile terminal device. Mobile terminal devices, in particular mobile telephones frequently have movement sensors, in particular designed as acceleration sensors, i.e. an inertial sensor system, the data of which can also be taken into account for the power management of the switching device. An extremely power-efficient operation is thus possible.

It should again be noted at this point that the power-saving operation of the switching device is not only achievable due to the dependence on the movement signal, but is additionally achieved also due to the described silent reception with filtered forwarding and a transmission only if required, i.e. on demand. In this way, it is possible to equip road users, in particular pedestrians and cyclists who have no power supply, without excessive outlay, since no excessive power requirement of the communication device prevails.

In addition to the switching device, the inventors propose a communication device for car-to-X communication, comprising an antenna unit, a computing unit implemented in a mobile terminal device and the switching device described above to connect the antenna unit and the computing unit. This may involve, in particular, a DSRC communication device. All designs relating to the proposed switching device can be transferred analogously to the proposed communication device, with which, in particular on the basis of the modular design and power-optimized operation, the same advantages can therefore be achieved.

It can therefore be provided that the mobile terminal device is designed to evaluate at least a part of the received messages and/or to generate control commands for the switching device. While it is therefore essentially conceivable and also advantageously achievable that at least a part of the evaluation of the received messages takes place in the mobile terminal device, a design is also possible in which the mobile terminal device is ultimately designed mainly to configure the switching device by control commands according to the types already described.

In a particularly advantageous design, it can be provided that a plurality of sets of evaluation logic are provided on the mobile terminal device, of which one is selectable by a user. This means that, for example, applications for various roles of the communication user in the road traffic can be provided on the mobile terminal device, so that the entire communication device is configurable in a role-specific manner. Thus, for example, various sets of evaluation logic, in particular therefore from software, are conceivable for school crossing patrols and/or adults and/or children and/or cyclists. Thus, the main configuration takes place according to the functionalities to be implemented and the specific use of the communication device via the mobile terminal device, also including, if necessary, the selection of specific sets of rules, as already described in relation to the switching device, which are implemented on the switching device.

It can furthermore be provided that the mobile terminal device comprises at least one position sensor, in particular a GPS sensor, and/or a movement sensor, in particular an inertial sensor system. Additional information can be determined by sensors of this type, which can be used for the operation of the switching device either through transmission of the additional information to the switching device or corresponding control commands, which have been determined taking into account the additional information, to the switching device. Position information determined by the position sensor may, for example, be used to carry out the filtering and/or evaluation of received messages, while the signal of a movement sensor can, for example, define the essential operation of the switching device for power management purposes.

As already mentioned, it can be provided with particular advantage that the antenna unit is integrated into a school bag or a bicycle frame. Specific designs of antenna units are therefore possible, which can then be connected to the switching device, wherein it is, however, also conceivable that the antenna unit is already integrated into the switching device.

It can furthermore be provided that, in the case of a use of the communication device on a bicycle, at least one power-generating device of the bicycle is used to generate power to operate the switching device and/or the antenna unit. A bicycle may, for example, include a dynamo or the like as a power-generating device, the power of which, in the context of this discussion, can also, in particular additionally, be used to operate the switching device and, if necessary the antenna unit in order to increase the power efficiency and therefore the operating time of the communication device.

With the proposed communication device with the proposed switching device (gateway), a method for communication in a car-to-X network can be implemented in which the communication device is therefore used. A method of this type is characterized in that at least a part of the messages received by the antenna unit and the switching device is evaluated by the mobile terminal device and/or at least one functionality of the switching device is set and/or parameterized by the mobile terminal device. These facilities for configuring the switching device or for taking over a part of the evaluation functionality have already been explained in detail in relation to the proposed devices. Aspects of a method of this type can be found in the relevant description.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
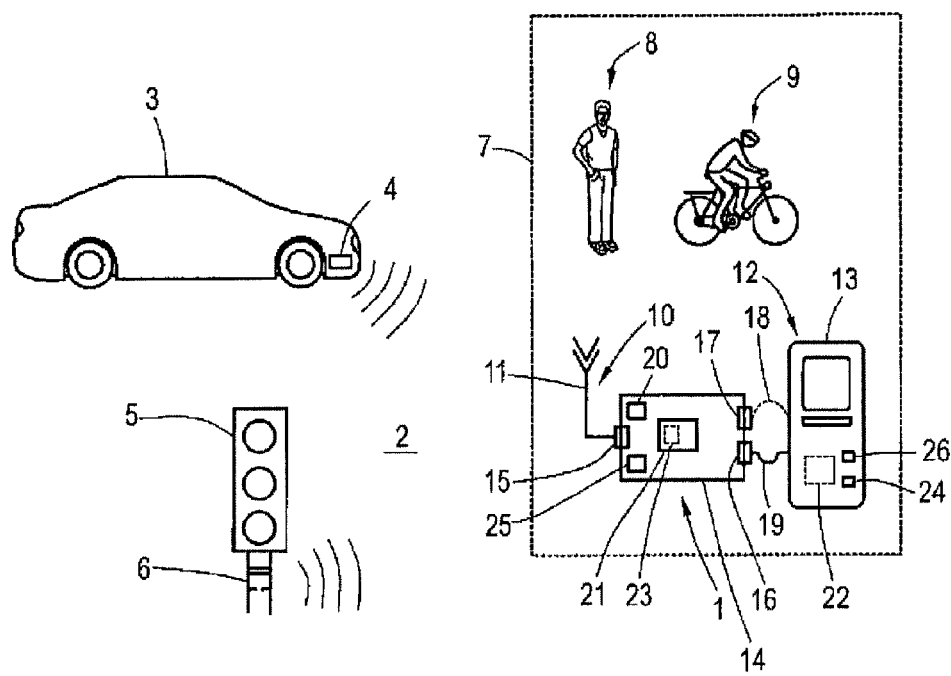
FIG. 1 shows proposed devices in the environment of a car-to-X network.

Reference will now be made in detail to the preferred embodiments of the present invention, examples of which are illustrated in the accompanying drawings, wherein like reference numerals refer to like elements throughout.

FIG. 1 shows a communication device 1 in the context of a car-to-X communication network 2, in which, purely as an example, a motor vehicle 3 with a communication device 4 and a traffic light 5 as an infrastructure component with a communication device 6 can be seen. The communication device 1, here a DSRC (dedicated short wave communication) device, can advantageously be used to equip further road users 7, for example a pedestrian 8 or cyclist 9, and essentially enable them to communicate in the communication network 2, so that new functionalities, for example a warning about pedestrians or cyclists or warning of the pedestrians and cyclists themselves, can be implemented for the further road user 7 in exactly the same way as for the motor vehicle 2 and the infrastructure components.

The communication device 1 is of modular design and comprises an antenna unit 10 implemented here as a separate module with an antenna 11 and a mobile terminal device 12, here a mobile telephone 13, as a computing unit, which are connected via a switching device 14 (gateway). For this purpose, the switching device 14 has a connection 15 for the antenna unit 10 and a wired interface 16, here a USB interface, and a wireless interface 17, here a Bluetooth interface, via which a connection to the mobile telephone 13 can be established. Whereas a wireless communication connection 18 can be set up via the Bluetooth interface 17, a cable 19 can also be used via the USB interface 16. The cable 19 can furthermore be used to use power from the mobile telephone 13 to operate the switching device 14 and, if necessary, the antenna unit 10, which means that the switching device 14, i.e. the gateway, is designed to receive and use power via the USB interface 16.

Nevertheless, the switching device 14 also has its own power source or its own power storage system 20, here a rechargeable battery.

For the power feed to operate the switching device 14, it is furthermore also conceivable to use a power-generating device of the bicycle, for example a dynamo.

However, the core of the switching device 14 is its control device 21, which is designed here to filter messages received via the antenna 11 in terms of their relevance and at least partially forward them to the mobile terminal device 12, but also in order to carry out at least partially an evaluation of the received messages. Moreover, the control device 21 is designed to transmit its own messages via the antenna unit 10 only if required, so that power-saving operation is possible. The control device 21 and therefore the entire switching device 14 is configured in its functionality via control commands of the mobile telephone 13, wherein it must be noted at this point that designs are also conceivable in which only the configuration of the switching device 14 is carried out via the mobile telephone 13. However, it is preferable to transfer at least a part of the required computing power to the mobile telephone 13.

In order to be able to implement the functionalities required for the communication device 1, software is stored at memory 22 provided on the mobile telephone 13, which software can therefore easily be retrofitted on the mobile telephone 13.

As already described, it is possible and also provided in the design described here that at least a part of the received messages is forwarded to the mobile telephone 13. For this purpose, the control device 21 comprises a filter 23, which filters out messages in advance which are not necessary for the current usage purpose, and therefore also contributes to a low power consumption. The filtering is carried out using filter rules, which are configurable via the mobile telephone 13, either in the form of a specific setting or as a selection of a specific set of filter rules, which can, for example, be stored in a permanently defined manner in the control device 21.

In addition, the control device 21 already has basic functionalities relating to the evaluation of received messages beyond the filtering, wherein the result of the evaluation may, for example, be the transmission of a dedicated message via the antenna unit 10, but also the transmission of information relating to a warning and/or an output to the mobile telephone 13, which then correspondingly takes over the other visual and/or audible output, for example of information. The type of evaluation is also definable via the mobile terminal device 12, here the mobile telephone 13, using corresponding control commands, wherein it can also be provided that, for example, sets of rules can in turn be permanently implemented, between which a selection can be made.

However, additional information which is determinable by the control device 21 itself or is provided by the mobile terminal device 12 can also be taken into account in the evaluation within the switching device 14, where, for example, the signal strength of a received message can provide information on a distance or distance class, and/or a position sensor 24 of the mobile terminal device 12, here the mobile telephone, can provide position information. For example, it can be provided that the mobile telephone 13 transmits position information on demand or cyclically to the switching device 14. Additional information of this type can therefore also be used to support the basic functionality which the switching device 14 already provides.

However, it should be noted at this point that designs are also conceivable in which the entire evaluation operation is transferred to the mobile terminal device 12, here the mobile telephone 13.

As already mentioned, the presented communication device 1 is already essentially power-saving, since a part of the functionality can be transferred to the mobile terminal device 12, a transmission is carried out only in strictly defined cases and, if necessary, also a power feed of the mobile terminal device 12 to the switching device 14 is conceivable. However, the power management of the communication device 1, in particular the switching device 14, is still further improved in that the control device 21 is designed to operate the switching device 14 only if a signal indicating a movement of the switching device 14 is present, which, for example, can be obtained via a movement sensor 25 incorporated into the switching device 14 itself, here an inertial sensor system, but can also be provided by the mobile terminal device 12, since, for example, mobile telephones themselves frequently have a movement sensor system 26.

The control device 21 is also designed here still to interpret a movement signal as indicating a movement if a specific time period, for example two minutes, has not yet elapsed following the measurement of the last actual movement, which means that a temporary stopping of the road user 7 does not instantaneously result in a cessation of the operation of the switching device 14, but this must occur for a longer period, so that brief movement pauses do not also result in a restriction of overall functionality.

It should again be clearly emphasized at this point that the mobile telephone 13 is shown only as an example and it is one of the significant advantages of the switching device 14 that it can be connected to a multiplicity of different mobile terminal devices 12, on which only the software 22 needs to be subsequently installed, since conventional connection technologies such as Bluetooth and USB are used.

Figure 2:
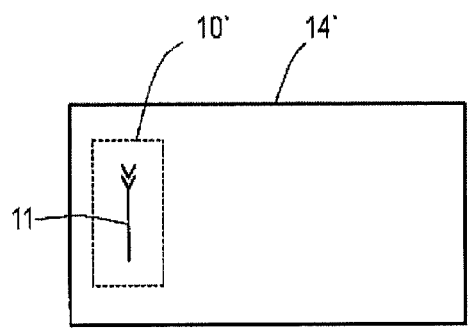
FIG. 2 shows a modified design of the proposed switching device.

The antenna 11 of the antenna unit 10 can be designed for specific applications, wherein a connection to the standardized switching device 14 is essentially possible. The antenna 11 can therefore, for example, be present as integrated into a schoolbag or a bicycle frame. However, it is also conceivable in a different embodiment, cf. FIG. 2, that an antenna unit 10 with an antenna 11 is integrated into a switching device 14'.

Finally, it should also be noted that the switching device 14 and the communication device 1 can also be easily configured for a wide range of different applications if the software 22 contains a plurality of sets of evaluation logic which are selectable by a user. Thus, for example, specific functions for pedestrians, cyclists, school crossing patrols and the like can be implemented as adapted to the specific role of the person and implemented with the communication device 1.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A switching device connected to an antenna unit for car-to-X communication, comprising:
    an interface to communicate with a mobile terminal device, the mobile terminal device comprising a computing unit; and
    a control device to receive messages via the antenna, and to selectively forward the received messages from the antenna unit to the mobile terminal device based on control commands from the mobile terminal device and to selectively transmit alert messages to the mobile terminal device based on control commands from the mobile terminal device,
    the control device having a filter configurable based on control commands received from the mobile terminal device to selectively filter out as irrelevant received messages from the antenna unit such that received messages which are irrelevant are not forwarded to the mobile terminal device.

2. The switching device according to claim 1, wherein the control device performs an evaluation on at least a portion of the received messages from the antenna unit.

3. The switching device according to claim 2, wherein
    each evaluation compares an evaluated message against a rule to produce an evaluation result, and
    the control device decides whether to transmit an alert message via the antenna unit based on the evaluation result.

4. The switching device according to claim 3, wherein the rule is part of a set of rules defined based on the control commands from the mobile terminal device.

5. The switching device according to claim 2, wherein
    each evaluation compares an evaluated message against a rule to produce an evaluation result, and based on the evaluation result, the control device decides whether to forward the evaluated message to the mobile terminal device and/or to transmit an alert message.

6. The switching device according to claim 1, wherein the antenna unit is integrated into the switching device.

7. The switching device according to claim 1, wherein the interface is a wireless interface and/or a wired interface.

8. The switching device according to claim 1, wherein the interface comprises a wired interface, and the switching device operates with operating power received from the mobile terminal device via the wired interface.

9. The switching device according to claim 1, wherein for the interface, both a wireless interface and a wired interface are provided.

10. The switching device according to claim 1,
wherein the received messages are received via fixed radio frequencies and then processed before being selectively forwarded to the mobile terminal device.

11. The switching device according to claim 1, wherein the control device both selectively forwards received messages from the antenna unit and selectively transmits alert messages, based on control commands from the mobile terminal device.

12. The switching device according to claim 1, wherein the control device transmits alert messages via the antenna unit.

13. The switching device according to claim 1, wherein the control device transmits alert messages to a user of the switching device.

14. A switching device connected to an antenna unit for car-to-X communication, comprising:
an interface to communicate with a mobile terminal device, the mobile terminal device comprising a computing unit; and
a control device to selectively forward received messages from the antenna unit to the mobile terminal device based on control commands from the mobile terminal device and/or to selectively transmit alert messages based on control commands from the mobile terminal device, the control device having a filter configured based on control commands from the mobile terminal device to selectively filter out as irrelevant received messages from the antenna unit,
wherein the control device performs an evaluation on at least a portion of the received messages from the antenna unit,
for at least a portion of the received messages from the antenna unit, the control device decides whether to forward messages based on a receive signal strength, and/or
for at least a portion of the transmit messages from the mobile terminal device, the control device decides whether to forward messages based on additional information transmitted by the mobile terminal device.

15. The Switching device according to claim 14, wherein
the additional information transmitted by the mobile terminal device comprises information about the position of the mobile terminal device, and
for at least a portion of the received messages from the antenna unit, the control device decides whether to forward messages based a comparison of the position of the mobile terminal device and the positions of the communication users that transmitted the received messages.

16. A switching device connected to an antenna unit for car-to-X communication, comprising:
an interface to communicate with a mobile terminal device, the mobile terminal device comprising a computing unit; and
a control device to selectively forward received messages from the antenna unit to the mobile terminal device based on control commands from the mobile terminal device and/or to selectively transmit alert messages based on control commands from the mobile terminal device, the control device having a filter configured based on control commands from the mobile terminal device to selectively filter out as irrelevant received messages from the antenna unit,
wherein
the control device activates the switching device only when a movement signal indicating a movement of the switching device is received, and
after the movement signal, the control device deactivates the switching device.

17. The switching device according to claim 16, further comprising a movement sensor to produce the movement signal.

18. The switching device according to claim 16, wherein the movement signal is received from the mobile terminal device.

19. The switching device according to claim 16, wherein after the movement signal, the control device waits a predefined time period before deactivating the switching device.

20. A communication device for car-to-X communication, comprising:
an antenna unit;
a fixed radio frequency transceiver to receive and transmit messages via the antenna unit;
an interface to communicate with a mobile terminal device, the mobile terminal device comprising a computing unit; and
a switching device configured based on control commands received from the mobile terminal device, to selectively forward messages to the mobile terminal device among messages received at the antenna unit on the fixed radio frequency, and to selectively transmit alert messages from the mobile terminal device, the alert messages comprising messages transmitted at the antenna unit on the fixed radio frequency, the switching device having a filter configurable based on control commands received from the mobile terminal device to selectively filter out as irrelevant received messages from the antenna unit such that received messages which are irrelevant are not forwarded to the mobile terminal device.

21. The communication device according to claim 20, wherein the mobile terminal device evaluates at least a part of the information from messages received at the antenna unit and determines whether at least one of the alert messages should be transmitted.

22. The communication device according to claim 20, wherein
a plurality of sets of evaluation logic are provided in the mobile terminal device, and
one set of evaluation logic is selected by a user to establish the control commands.

* * * * *